United States Patent
Tsuzuki et al.

(10) Patent No.: US 9,073,477 B2
(45) Date of Patent: Jul. 7, 2015

(54) VEHICLE APPROACH NOTIFICATION DEVICE

(71) Applicant: ANDEN CO., LTD., Anjo, Aichi-pref. (JP)

(72) Inventors: Haruyuki Tsuzuki, Toyota (JP); Hironari Tajimi, Obu (JP)

(73) Assignee: ANDEN CO., LTD., Anjo (JP)

( * ) Notice: Subject to any disclaimer, the term of this patent is extended or adjusted under 35 U.S.C. 154(b) by 141 days.

(21) Appl. No.: 13/974,359

(22) Filed: Aug. 23, 2013

(65) Prior Publication Data

US 2014/0085071 A1 Mar. 27, 2014

(30) Foreign Application Priority Data

Sep. 26, 2012 (JP) ................. 2012-212425

(51) Int. Cl.
*B60Q 1/54* (2006.01)
*B60Q 5/00* (2006.01)
*G10K 15/02* (2006.01)

(52) U.S. Cl.
CPC ............... *B60Q 5/008* (2013.01); *G10K 15/02* (2013.01)

(58) Field of Classification Search
CPC .................................. B60Q 1/506; B60Q 1/54
USPC ............ 340/466, 463, 435, 903, 425.5, 901; 381/86; 701/31.4, 22, 36
See application file for complete search history.

(56) References Cited

U.S. PATENT DOCUMENTS

| 8,878,659 B2 * | 11/2014 | Tsuzuki et al. ............... 340/435 |
| 2012/0146780 A1 | 6/2012 | Tsuzuki et al. |
| 2013/0257605 A1 | 10/2013 | Tsuzuki et al. |
| 2013/0314251 A1 | 11/2013 | Tsuzuki |

FOREIGN PATENT DOCUMENTS

| JP | 05213112 A | 8/1993 |
| JP | 2012-017071 A | 1/2012 |
| JP | 2013-028232 A | 2/2013 |

* cited by examiner

*Primary Examiner* — Vernal Brown
*Assistant Examiner* — Hongmin Fan
(74) *Attorney, Agent, or Firm* — Posz Law Group, PLC

(57) ABSTRACT

In a vehicle approach notification device for notifying approach of a vehicle by emitting a notification sound according to a synthetic sound signal composed of a plurality of frequency components from a speaker, a vehicle speed specifying portion specifies a speed of the vehicle, and a synthetic sound signal generating portion generates the synthetic sound signal. The synthetic sound signal generating portion generates the synthetic sound signal such that the frequency component that belongs to a second frequency range in which a variation in sound pressure outputted from the speaker is equal to or smaller than a predetermined magnitude is shifted according to a change in the speed of the vehicle, without shifting the frequency component that belongs to a first frequency range in which the variation in sound pressure outputted from the speaker is greater than the predetermined magnitude.

1 Claim, 4 Drawing Sheets

VEHICLE APPROACH NOTIFICATION DEVICE

CROSS REFERENCE TO RELATED APPLICATION

This application is based on Japanese Patent Application No. 2012-212425 filed on Sep. 26, 2012, the disclosure of which is incorporated herein by reference.

TECHNICAL FIELD

The present disclosure relates to a vehicle approach notification device that generates a synthetic sound signal composed of a plurality of frequency components and emits a notification sound according to the synthetic sound signal for notifying approach of a vehicle.

BACKGROUND

An electric vehicle, which includes an electric motor only as a driving source for traveling, is silent when traveling at low speeds. A hybrid vehicle, which includes an electric motor and an internal combustion engine as a driving source for traveling, is silent when travelling at low speeds by a driving force generated by the electric motor. Therefore, pedestrians and the like are less likely to notice approach of the vehicle.

To address the above issue, it has been known a vehicle approach notification device for such a silent vehicle that generates a notification sound to notify a pedestrian and the like of a presence of the vehicle. For example, JP-A-05-213112 discloses a vehicle approach notification device that generates a notification sound signal which has a frequency changing according to a vehicle speed, and emits a notification sound based on the notification sound signal to a periphery of a vehicle.

Also, it has been known to generate a pseudo engine sound or a pseudo motor sound, as the notification sound, by a synthetic sound (a chord sound) composed of a plurality of frequency components. Further, it has been known to change each frequency of the synthetic sound little by little according to the change of the vehicle speed so that a pedestrian and the like can recognize the speed of the vehicle. Such a technology is, for example, disclosed in JP-A-2012-17071.

SUMMARY

It is an object of the present disclosure to provide a vehicle approach notification device that generates a notification sound capable of notifying a speed of a vehicle to a periphery of the vehicle while reducing a variation in sound pressure of the notification sound and maintaining balance of frequency components of the notification sound.

According to an aspect of the present disclosure, a vehicle approach notification device notifies approach of a vehicle by emitting a notification sound according to a synthetic sound signal composed of a plurality of frequency components from a speaker. The vehicle approach notification device includes a vehicle speed specifying portion and a synthetic sound signal generating portion. The vehicle speed specifying portion specifies a speed of the vehicle. The synthetic sound signal generating portion generates the synthetic sound signal in such a manner that the frequency component that belongs to a second frequency range is shifted according to a change of the speed of the vehicle, without shifting the frequency component that belongs to a first frequency range. The second frequency range corresponds to a frequency range in which a variation in sound pressure outputted from the speaker is equal to or smaller than a predetermined magnitude, and the first frequency range corresponds to a frequency range in which the variation in sound pressure outputted from the speaker is greater than the predetermined magnitude.

In the above configuration, the synthetic sound signal is generated such that the frequency component belonging to the second frequency range in which the variation in sound pressure outputted from the speaker is equal to or smaller than the predetermined magnitude is shifted in accordance with the change of the speed of the vehicle, without shifting the frequency component belonging to the first frequency range in which the variation in sound pressure is greater than the predetermined magnitude. Therefore, the notification sound is generated while reducing the variation in of sound pressure and maintaining the balance of frequency components of the notification sound.

Accordingly, a pedestrian and the like will properly notice the speed of the vehicle.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
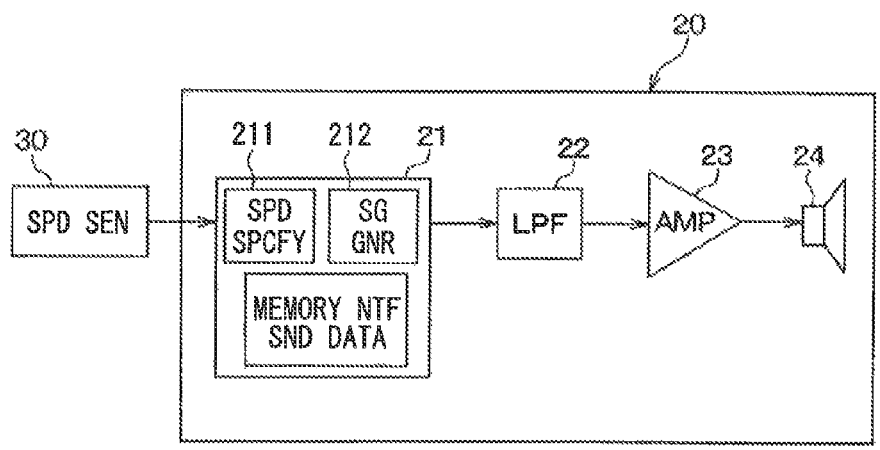
FIG. 1 is a diagram illustrating a schematic structure of a vehicle approach notification device according to an embodiment of the present disclosure.

A structure of a vehicle approach notification device according to an embodiment of the present disclosure is illustrated in FIG. 1. The vehicle approach notification device generates a synthetic sound signal composed of a plurality of frequency components, and emits a notification sound according to the synthetic sound signal from a speaker, thereby to notify approach of the vehicle. The synthetic sound signal enables the speaker to generate a pseudo traveling sound such as a pseudo engine sound or a pseudo motor sound.

As shown in FIG. 1, a vehicle approach notification device 20 includes a control unit 21, a low pass filter (hereinafter, simply referred to as LPF) 22, a power amplifier (hereinafter, simply referred to as AMP) 23, and a speaker 24. The control unit 21 is coupled to a vehicle speed sensor 30 that outputs a vehicle speed signal indicative of a speed of the vehicle.

The control unit 21 is provided by a microcomputer including a CPU, a memory, an I/O element and the like. The CPU performs various processes in accordance with programs stored in the memory. The memory has a control program for sound production, data of pulse cord modulation (PCM), that is, data provided by encoding a magnitude of sound, and the like. Also, the memory has an operation expression for calculation of a sound pressure level according to a vehicle speed, a map indicating a relationship between the sound pressure level and the vehicle speed, or the like.

The control unit 21 includes a vehicle speed specifying portion 211 and a synthetic sound signal generating portion 212. The vehicle speed specifying portion 211 specifies the vehicle speed based on the vehicle speed signal outputted from the vehicle speed sensor 30. The synthetic sound signal generating portion 212 generates the synthetic sound signal (voltage waveform signal) using approach notification sound data stored in the memory.

The synthetic sound signal generating portion 212 includes a digital-to-analog converter that converts a digital signal to an analog signal. When receiving the vehicle speed signal from the vehicle speed sensor 3, the synthetic sound signal generating portion 212 calculates a sound pressure level corresponding to the vehicle speed based on the operation expression or the map, and sets the PCM data according to the calculated sound pressure level. The synthetic sound signal generating portion 212 then sets the PCM data set according to the sound pressure level to the digital-to-analog converter and outputs to the LPF 22 at a predetermined sampling interval.

The LPF 22 is provided to eliminate a high frequency noise component contained in the synthetic sound signal (voltage waveform signal) outputted from the synthetic sound signal generating portion 212.

The AMP 23 amplifies the voltage of the synthetic sound signal provided from the control unit 21 through the LPF 22, and outputs the amplified voltage. The sound pressure generated by the speaker 24 is determined by the value of electric current supplied from the AMP 23. The value of the electric current supplied from the AMP 23 is determined by the waveform of the synthetic sound signal (voltage waveform signal) outputted from the synthetic sound signal generating portion 212.

The speaker 24 generates the notification sound with the sound pressure according to the electric current supplied from the AMP 23.

The control unit 21 specifies the vehicle speed based on the vehicle speed signal provided from the sensor 30, and generates the synthetic sound signal according to the vehicle speed. Further, the control unit 21 provides the synthetic sound signal to the AMP 23 through the LPF 22. The AMP 23 amplifies the synthetic sound signal and outputs the amplified synthetic sound signal to the speaker 24.

The control unit 21 performs frequency pitch-up control to shift a part of a plurality of frequency components constituting the synthetic sound signal to a higher frequency level according to the increase of the vehicle speed, such that a pedestrian and the like can recognize the speed of the vehicle.

Figure 2:
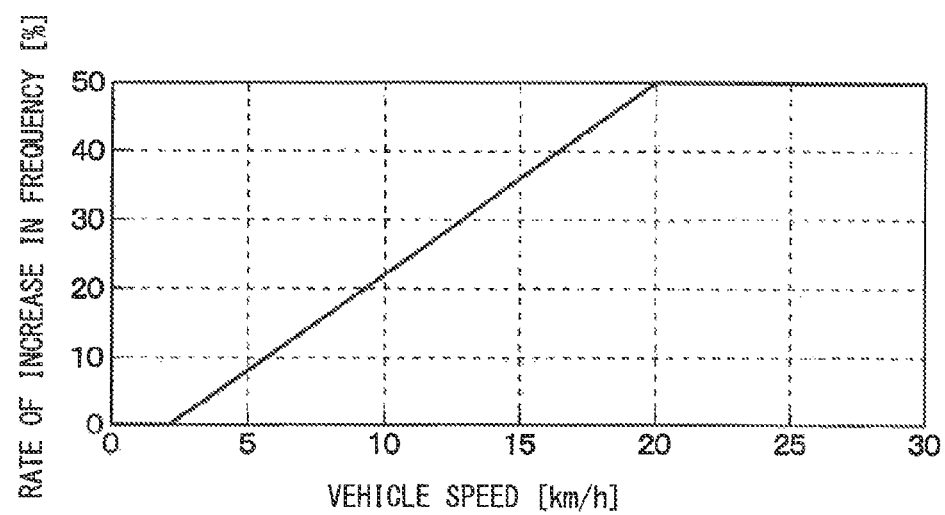
FIG. 2 is a diagram for explaining a frequency pitch-up control.

The frequency pitch-up control will be described with reference to FIG. 2. The control unit 21 shifts the frequency components (basic frequency components) constituting the synthetic sound signal to higher frequencies according to the vehicle speed. In particular, the control unit 21 shifts each of the frequency components (basic frequency components) constituting the synthetic sound signal to a higher frequency by a rate of increase in frequency corresponding to the vehicle speed.

For example, when the vehicle speed is 10 kilometers per hour (km/h), the rate of increase in frequency is 22 percents (%). In this case, therefore, each of the frequency components (basic frequency components) constituting the synthetic sound signal is shifted to a higher frequency by a frequency corresponding to 22% of the frequency component to be shifted. When the vehicle speed is 20 km/h, the rate of increase in frequency is 50%. In this case, therefore, each of the frequency components (basic frequency components) is shifted to a higher frequency by a frequency corresponding to 50% of the frequency component to be shifted.

However, the characteristic of sound pressure outputted from the speaker is different depending on a frequency range. Therefore, in a case where each of the frequency components constituting the synthetic sound is changed according to the change of the vehicle speed, the sound pressure of a part of the frequency components constituting the synthetic sound is likely to be changed due to the frequency characteristic of the speaker.

Figure 3:
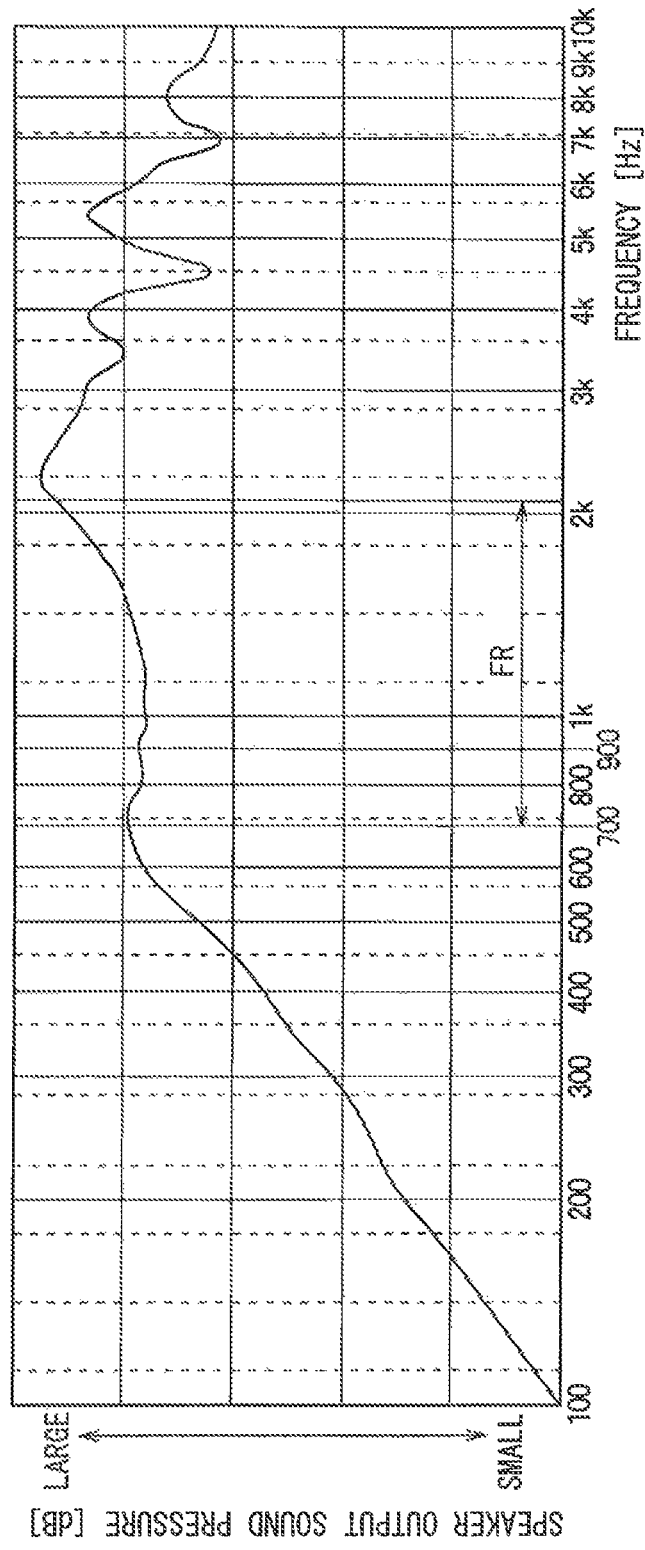
FIG. 3 is a graph illustrating a relationship between a frequency and a sound pressure outputted from a speaker.

FIG. 3 is a graph illustrating an example of a relationship between frequency and output sound pressure of the speaker 24, that is, an output sound pressure characteristic of the speaker 24 with respect to the frequency. As shown in FIG. 3, in a frequency range between equal to or greater than 700 hertz (Hz) and less than 2.1 kilohertz (kHz), the output sound pressure characteristic is substantially flat, that is, a variation in sound pressure is relatively small. The frequency range between equal to or greater than 700 Hz and less than 2.1 kHz, in which the output sound pressure characteristic is substantially flat, is referred to as a flat frequency range FR. In a frequency range lower than 700 Hz and a frequency range equal to or greater than 2.1 kHz, the output sound pressure characteristic is not flat, that is, a variation in sound pressure is relatively large.

In the flat frequency range FR, even when each of the frequencies constituting the synthetic sound is changed, the output sound pressure does not change. However, in the frequency range where the output sound pressure characteristic is not flat, when each of the frequencies constituting the synthetic sound is changed, the output sound pressure fluctuates, that is, increases or decreases. Therefore, the sound pressure of the whole of the notification sound largely varies in accordance with the change of the vehicle speed. As a result, a pedestrian and the like are less likely to recognize the approach of the vehicle or are likely to feel the notification sound as noise.

For example, if the sound pressure of the whole of the notification sound is reduced, a pedestrian and the like will not notice the approach of the vehicle. If the sound pressure of the whole of the notification sound is increased, a pedestrian and the like and a passenger in a passenger compartment of the vehicle will feel the notification sound as noise. Further, if balance of the frequency components constituting the notification sound is reduced, the notification sound will be audible differently.

In the present embodiment, the frequency components are categorized into a first frequency range and a second frequency range. The first frequency range corresponds to a frequency range in which the variation in sound pressure of the speaker is greater than a predetermined magnitude, and the second frequency range corresponds to a frequency range in which the variation in sound pressure of the speaker is equal to or smaller than the predetermined magnitude. The control unit 21 performs a process to generate the synthetic sound signal so that the frequency components belonging to the second frequency range are shifted in accordance with the vehicle speed without shifting the frequency components belonging to the first frequency range, and provide the generated synthetic sound signal to the AMP 23 through the LPF 22.

Figure 4:
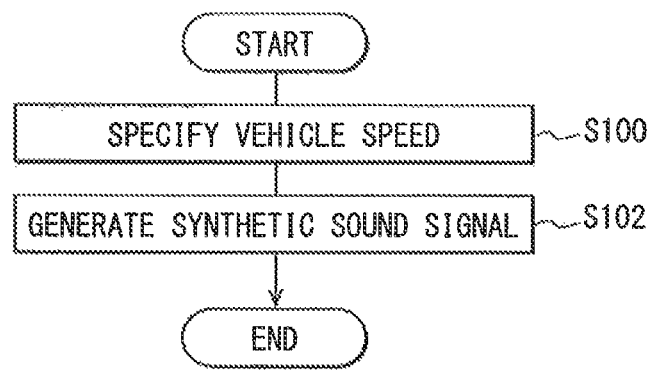
FIG. 4 is a flowchart illustrating a process performed by a control unit of the vehicle approach notification device according to the embodiment.

FIG. 4 is a flowchart illustrating the process performed by the control unit 21. When an ignition switch of the vehicle is in on state, the vehicle approach notification device is activated, and the control unit 21 periodically performs the process shown in FIG. 4.

First, the control unit 21 specifies the vehicle speed based on the vehicle speed signal provided from the vehicle speed sensor 30 (S100).

Next, the control unit 21 generates and outputs the synthetic sound signal (S102). In particular, the control unit 21 generates the synthetic sound signal such that the frequency components belonging to the second frequency range are shifted without shifting the frequency components belonging to the first frequency range. In this case, the first frequency range includes the frequency range less than 700 Hz and the frequency range equal to or greater than 2.1 kHz. The second frequency range corresponds to the flat frequency range FR defined between equal to or greater than 700 Hz and less than 2.1 kHz (700 Hz≤FR<2.1 kHz). The control unit 21 provides the generated synthetic sound signal to the AMP 23 through the LPF 22.

When the frequency components belonging to the second frequency range are shifted outside of the second frequency range, the variation of the sound pressure of the notification sound outputted from the speaker 24 increases.

Therefore, the control unit 21 shifts each of the frequency components belonging to the second frequency range within the second frequency range.

That is, the control unit 21 shifts each of the frequency components belonging to the second frequency range so that the frequency component is not shifted outside of the second frequency range.

In the present embodiment, the maximum rate of increase of the frequency is 50%, and the flat frequency range FR where the output sound pressure characteristic is substantially flat is defined in a. range between equal to or greater than 700 Hz and less than 2.1 kHz. (700 Hz≤FR<2.1 kHz)

In such a case, the frequency components that are equal to or greater than 700 Hz and less than 1.4 kHz before shifting are shifted so as to avoid the frequency components being shifted outside the flat frequency range FR.

In this case, even when the rate of increase of the frequency is 50%, the frequency component shifted is in a range between equal to or greater than 1.05 kHz and less than 2.1 kHz. Therefore, it is less likely that the frequency components will be shifted outside the flat frequency range FR.

Figure 5:
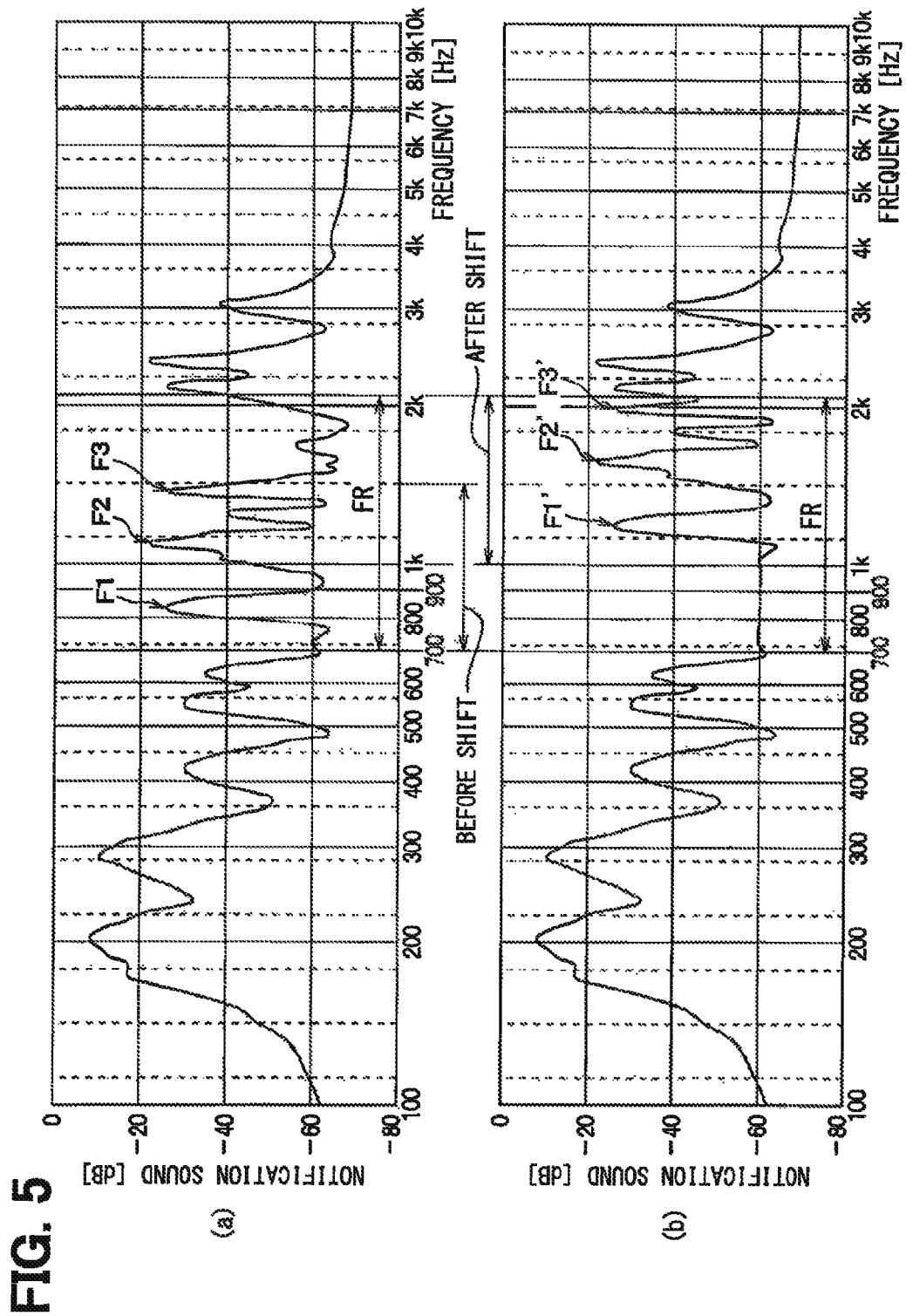
FIG. 5 is a graph illustrating a spectrum of a notification sound with respect to a frequency, in which (a) illustrates the spectrum of the notification sound when a rate of increase in frequency is 0%, and (b) illustrates the spectrum of the notification sound when the rate of increase in frequency is 50%.

In FIG. 5, (a) illustrates a spectrum indicating a characteristic of the notification sound when the rate of increase of the frequency is 0%, and (b) illustrates a spectrum indicating a characteristic of the notification sound when the rate of increase of the frequency is 50%.

Frequency components F1, F2, F3, which belong to the flat frequency range FR when the vehicle is stopped, that is, when the vehicle speed is zero, are gradually shifted to higher frequencies in accordance with the increase in vehicle speed. When the vehicle speed exceeds 20 km/h and the rate of increase of the frequency reaches 50%, the frequency components F1, F2, F3 are shifted to the higher frequencies as shown by frequency components F1', F2', F3', respectively.

In this case, frequencies of the frequency components that do not belong to the flat frequency range FR, that is, that belong to the first frequency range, are not shifted even when the vehicle speed is changed.

As described above, the control unit 21 generates the synthetic sound signal such that the frequency components belonging to the second frequency range, which corresponds to the flat frequency range FR, are shifted to higher frequencies within the second frequency range without shifting the frequency components belonging to the first frequency range, which corresponds to the frequency range in which the variation of the sound pressure of the speaker is not flat.

The AMP 23 amplifies the synthetic sound signal and outputs the amplified synthetic sound signal to the speaker 24. The speaker 24 outputs the notification sound according to the synthetic sound signal.

In the structure described above, the synthetic sound signal is generated such that the frequency components belonging to the second frequency range are shifted in accordance with the change in vehicle speed without shifting the frequency components belonging to the first frequency range. Therefore, the variation of the sound pressure of the notification sound is reduced. Also, it is less likely that balance of the frequency components constituting the notification sound will be degraded. Accordingly, the vehicle approach notification device can notify the speed of the vehicle to the periphery of the vehicle, such as to a pedestrian.

When the frequency components belonging to the second frequency range are shifted outside the second frequency range, the variation of the sound pressure of the notification sound emitted from the speaker is likely to increase. On the other hand, since the synthetic sound signal is generated such that the frequency components belonging to the second frequency range are shifted within the second frequency range, the variation of the sound pressure of the notification sound emitted from the speaker can be reduced.

In a case where the synthetic sound signal is generated such that the plurality of frequency components belonging to the second frequency range is shifted, the rate of change in frequency of the entirety of the notification sound is increased, as compared to a case where only one of the frequency components belonging to the second frequency range is shifted. Therefore, the vehicle approach notification device can properly notify the speed of the vehicle to the periphery of the vehicle.

The synthetic sound signal is generated such that the frequency components belonging to the second frequency range are shifted to higher frequencies according to the increase of the vehicle speed.

The present disclosure is not limited to the embodiment described above, but may be implemented in any other ways without departing from the gist of the disclosure.

For example, in the embodiment described above, the synthetic sound signal is generated such that the frequency components belonging to the second frequency range are shifted within the second frequency range. However, it is not always necessary to generate the synthetic sound signal such that the frequency components belonging to the second frequency range are shifted within the second frequency range.

In the above description, the synthetic sound signal is generated such that the three frequency components belonging to the second frequency range are shifted. However, the number of the frequency components to be shifted may not be limited to three. For example, the synthetic sound signal may be generated such that four or more frequency components belonging to the second frequency range are shifted, or one of the frequency components belonging to the second frequency range is shifted.

The synthetic sound signal is generated such that the frequency components belonging to the second frequency range are shifted to the higher frequencies with the increase in vehicle speed. However, it is not always necessary to generate the synthetic sound signal such that the frequency components belonging to the second frequency range are shifted to the higher frequencies. For example, the synthetic sound signal may be generated such that the frequency components belonging to the second frequency range are shifted to lower frequencies with the increase of the vehicle speed.

In the above embodiment, the speaker that has the flat frequency range FR in the range between equal to or greater than 700 Hz and less than 2.1 kHz. However, the speaker may not be limited to the one having the above-described characteristics.

In the above embodiment, S100 corresponds to a vehicle speed specifying section, and may be performed by the vehicle speed specifying portion 211. Also, S102 corresponds to a synthetic sound signal generating section, and may be performed by the synthetic sound signal generating section 212.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A vehicle approach notification device for notifying approach of a vehicle by emitting a notification sound from a speaker, the notification sound being emitted according to a synthetic sound signal composed of a plurality of frequency components, the vehicle approach notification device comprising: a vehicle speed specifying portion that specifies a speed of the vehicle; and a synthetic sound signal generating portion that generates the synthetic sound signal in such a manner that the frequency component that belongs to a second frequency range is shifted according to a change of the speed of the vehicle specified by the vehicle speed specifying portion, without shifting the frequency component that belongs to a first frequency range, the second frequency range corresponding to a frequency range in which a variation in sound pressure outputted from the speaker is equal to or less than a predetermined magnitude, the first frequency range corresponding to a frequency range in which the variation in sound pressure outputted from the speaker is greater than the predetermined magnitude;

wherein the synthetic sound signal generating portion generates the synthetic sound signal in such a manner that the frequency component that belongs to the second frequency range is shifted within the second frequency range.

* * * * *